Feb. 11, 1964 W. R. GRANER 3,120,875
SONAR DOME
Filed Dec. 27, 1961 2 Sheets-Sheet 1

INVENTOR
WILLIAM R. GRANER
BY
ATTORNEY

INVENTOR
WILLIAM R. GRANER 3,120,875
SONAR DOME
William R. Graner, Washington, D.C., assignor to the United States of America as represented by the Secretary of the Navy
Filed Dec. 27, 1961, Ser. No. 162,619
10 Claims. (Cl. 181—.5)
(Granted under Title 35, U.S. Code (1952), sec. 266)

The invention described herein may be manufactured and used by or for the Government of United States of America for governmental purposes without the payment of any royalties thereon or therefor.

The present invention relates to sonar domes and more particularly to plastic sonar domes which are capable of deep submergence, and high speed.

The prior art contains sonar domes of various types and designs. However, as submarines go deeper and faster more complex problems are generated in the field of sonar dome designs. They are required to take more punishment then sonar domes of surface vessels, while retaining their acoustic characteristics. Therefore, the problem is to provide structural adequacy while still maintaining a high acoustic transmission capability thru the sonar dome.

An object of the present invention is the provision of a structurally sound sonar dome for deep submergence.

Another object is to provide a sonar dome which has high acoustic transmission capabilities.

A further object of the invention is to provide a sonar dome which is relatively easy to manufacture.

Still another object is to provide a sonar dome which is capable of being used with the present sonar transducers.

In accordance with the preferred form of the invention the sonar dome is provided with a core of high impact polyvinylchloride, and thin outer skins of Dacron-reinforced material which is to be molded into the desired shape. If the sonar dome is to be a large one then stiffening ribs may be placed at intervals so as to add rigidity to the structure.

Other objects and many of the other intended advantages of this invention will be readily appreciated as the same becomes better understood by reference to the following detailed description when considered in connection with the accompanying drawings wherein.

Figure 1:
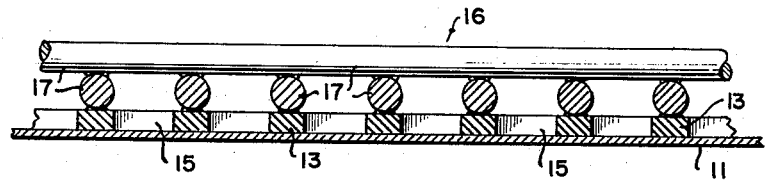
FIG. 1 illustrates a cross-section of a sonar dome of the prior art.

Referring to FIG. 1, which illustrates the prior art method of constructing a sonar dome of sufficient strength, a steel plate 11 forms the surface outer skin of a sonar dome. The skin is reinforced with a steel plate 13 which contains sonic windows 15. In order to have the sonar dome rigid under the influence of severe stresses encountered on the submarines in deep submergence and high speed runs a truss work 16 has to be constructed out of steel rods 17 which are welded together. In addition, the truss work 16 is also welded to the back of the steel plate 13. The combination of the thin skin 11 with the steel plate 13 and steel bars 17 is then molded and formed into the correct shape of the sonar dome. The sonar dome of FIG. 1, which is illustrative of the prior art, will have sufficient strength to withstand the necessary stresses. However, the sonic efficiency of the structure is very poor and also the intricacies of constructing the dome makes it very expensive. It is to be noted that fiber glass reinforced plastics or similar material may be substituted for the steel plate 11. However, these do not overcome the difficulties found in the basic structure.

Figure 2:
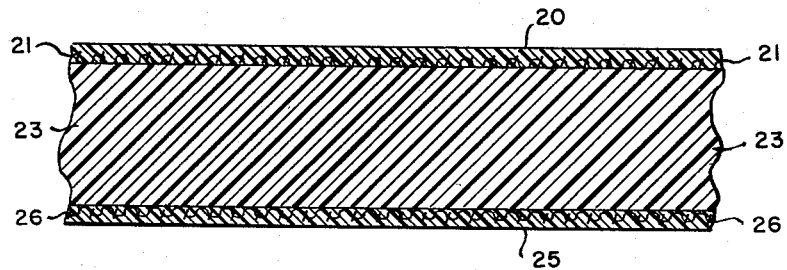
FIG. 2 illustrates a sectional view of a sonar dome of the instant invention.

FIG. 2 illustrates an embodiment of the invention which has been designed to overcome the difficulties found in the prior art and yet be able to withstand the extreme pressure and forces encountered by the sonar domes which are mounted on deep submergence and high speed submarines. It is to be understood, that the sonar dome will be molded in the desired shape depending upon the particular application and on the particular part of the submarine upon which it is to be used. The skin or surface 20 of the polyvinylchloride plastic sonar dome contains a Dacron reinforcement 21 embedded in the plastic. The Dacron reinforcement 21 is made out of a high strength Dacron cloth. Dacron is a polyester fiber of terephthalic acid and ethylene glycol and having a minimum melt of 480° Fahrenheit (240° centrigrade). However, it is to be noted that other high strength synthetic cloths such as nylon may be satisfactorily substituted for the Dacron.

A core of the high impact polyvinylchloride plastic 23 is placed or molded next to the skin 20 and forms an integral unit with the skin. Similarly a second Dacron reinforced skin 25 containing a woven Dacron cloth is applied on the other side of the polyvinylchloride core and forms an integral part therewith. Since the acoustical impedance of high impact polyvinylchloride is $1.95 \times 10^5$ grams/cm.$^2$ sec. which is close in value to that of water $1.535 \times 10^5$ grams/cm.$^2$ sec. Therefore the plastic core 23 can be made as thick as necessary in order to have the proper strength and still be an efficient sonic transmitting agent. The impedance of Dacron reinforced plastic is $2.3 \times 10^5$ grams/cm.$^2$ sec.

Figure 3:
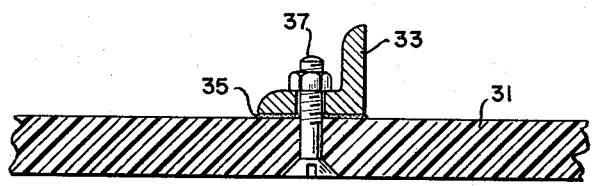
FIG. 3 illustrates a cross-section of a sonar dome utilizing a stiffening rib.
Figure 4:
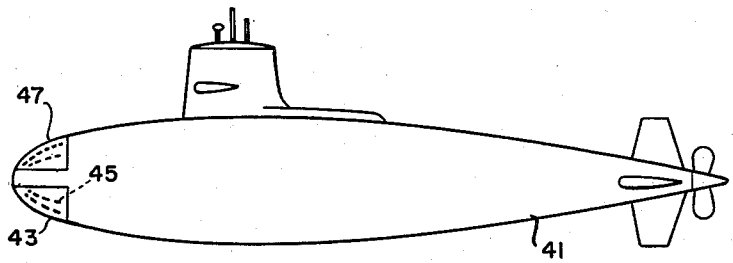
FIG. 4 illustrates a submarine mounted sonar dome which is constructed according to the teachings of the instant invention.

Referring to FIG. 3 a sonar dome section 31 is identical in construction to that of FIG. 2. A steel stiffening rib 33 is cemented to the plastic dome by way of an adhesive layer 35. The steel stiffening rib 33 is further bolted by series of bolts 37, the heads of which are embedded into the plastic. These steel stiffening ribs 33 are placed along the midsections of the sonar dome and do not have to extend to the end mountings or fittings but are merely to add stiffness to the plastic members. However, it is to be noted that other materials such as plastics and aluminum may be satisfactorily substituted for the steel in stiffening rib 33. An example of the use of stiffeners is shown in the submarine depicted in FIG. 4, wherein a pair of sonar domes 43 and 47 are mounted on the bow portion of a submarine 41. It is to be noted that the sonar domes 43 and 47 are over 14 feet long and merely have several reinforcing ribs 45 running lengthwise and spaced several feet apart to stiffen the domes. A minimum amount of damping is created because of the relatively wide gaps between the steel stiffening ribs. In addition, a minimum of reflective problems are created because the amount of metal in the sonar dome between the sonar transducer and the sea is greatly reduced.

Figure 5:
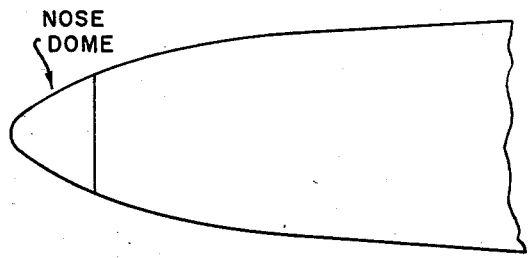
FIG. 5 illustrates a nose sonar dome utilizing the teachings of the instant invention.
Figure 6:
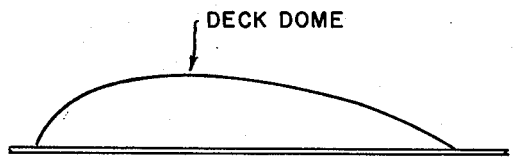
FIG. 6 illustrates a deck sonar dome utilizing the teachings of the instant invention.

FIGS. 5 and 6 illustrate a nose sonar dome and a deck sonar dome, respectively which may be constructed according to the teachings of the instant invention and do not need any reinforcing structure when used on deep submerging submarines.

Obviously many modifications and variations of the present invention are possible in the light of the above teachings. It is therefore to be understood that within the scope of the appended claims the invention may be practiced otherwise than as specifically described.

What is claimed is:

1. A high efficiency sonar dome for deep submergence comprising:
   (a) an acoustic transmitting material having upper and lower surfaces;
   (b) a first layer of reinforcing material;
   (c) a second layer of reinforcing material;
   (d) said first layer of reinforcing material being embedded under the upper surface of said acoustic transmitting material and forming a reinforcing layer;
   (e) said second layer of reinforcing material being embedded above the lower surface of said acoustic transmitting material and forming a reinforcing layer;
   (f) said reinforced acoustic transmitting material being formed into a sonar dome comprising a core of acoustic transmitting material sandwiched between two reinforcing layers.

2. A sonar dome as defined in claim 1, wherein:
   (a) said first layer of reinforcing material; and
   (b) said second layer of reinforcing material each comprise a layer of woven Dacron cloth.

3. A sonar dome as defined in claim 2 but further characterized by having:
   (a) stiffening ribs;
   (b) said stiffening ribs being permanently affixed to the inside of said sonar dome.

4. A sonar dome as defined in claim 1, wherein:
   (a) said first layer of reinforcing material; and
   (b) said second layer reinforcing material each comprise a layer of woven nylon cloth.

5. A sonar dome as defined in claim 4 but further characterized by having:
   (a) stiffening ribs;
   (b) said stiffening ribs being permanently affixed to the inside of said sonar dome.

6. A high efficiency sonar dome for deep submergence and high speed vessels comprising:
   (a) an acoustic transmitting material having upper and lower surfaces;
   (b) said acoustic transmitting material comprising a high impact polyvinylchloride plastic;
   (c) a first layer of reinforcing material;
   (d) a second layer of reinforcing material;
   (e) said first layer of reinforcing material being embedded under the upper surface of said high impact polyvinylchloride plastic and forming a reinforcing layer;
   (f) said second layer of reinforcing material being embedded above the lower surface of said high impact plastic and forming a reinforcing layer;
   (g) said reinforced high impact polyvinylchloride plastic being formed into a sonar dome having a high acoustic efficiency comprising a core of high impact polyvinylchloride sandwiched between two reinforcing layers.

7. A sonar dome as defined in claim 6, wherein:
   (a) said first layer of reinforcing material; and
   (b) said second layer of reinforcing material each comprise a layer of woven Dacron cloth.

8. A sonar dome as defined in claim 7:
   (a) but further characterized by having stiffening ribs;
   (b) said stiffening ribs being shorter in length than the diameter of the sonar dome so that the stiffening ribs do not extend to the edge of the sonar dome;
   (c) said stiffening ribs being permanently affixed to the sonar dome.

9. A sonar dome as defined in claim 6, wherein:
   (a) said first layer of reinforcing material
   (b) and said second layer of reinforcing material each comprise a layer of woven nylon cloth.

10. A sonar dome as defined in claim 9:
   (a) but further characterized by having stiffening ribs;
   (b) said stiffening ribs being shorter in length than the diameter of the sonar dome so that the stiffening ribs do not extend to the edge of the sonar dome;
   (c) said stiffening ribs being permanently affixed to the sonar dome.

References Cited in the file of this patent

UNITED STATES PATENTS

| | | |
|---|---|---|
| 2,434,666 | Mason | Jan. 20, 1948 |
| 2,444,911 | Benioff | July 13, 1948 |
| 3,038,551 | McCoy et al. | June 12, 1962 |
| 3,039,077 | Lasky et al. | June 12, 1962 |